Aug. 30, 1927.                    1,640,844
F. LE R. MAIN
PNEUMATIC TIRE
Filed Feb. 10, 1926
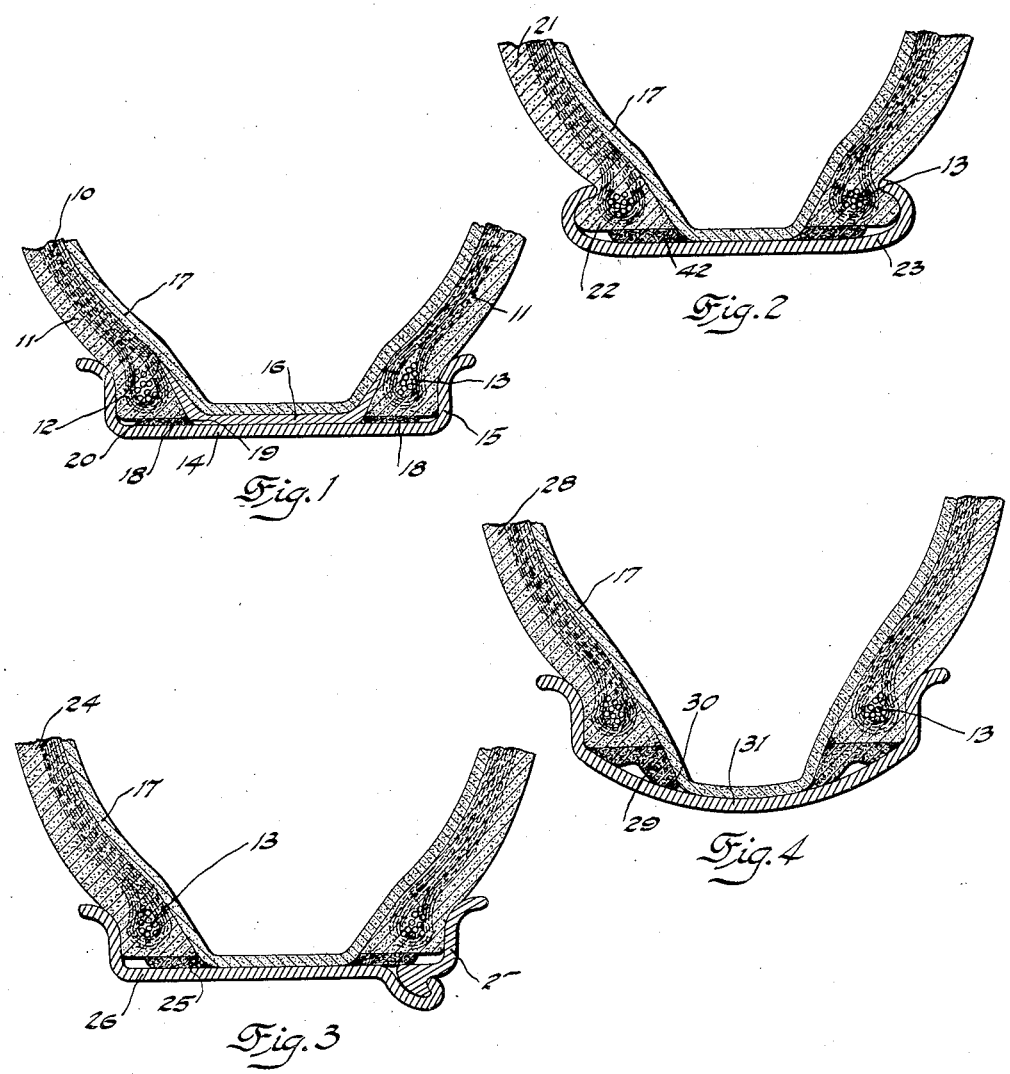
Inventor
Frank Le Roi Main Patented Aug. 30, 1927.

1,640,844

UNITED STATES PATENT OFFICE.

FRANK LE ROI MAIN, OF BIRMINGHAM, MICHIGAN, ASSIGNOR TO GENERAL MOTORS CORPORATION, OF DETROIT, MICHIGAN, A CORPORATION OF DELAWARE.

PNEUMATIC TIRE.

Application filed February 10, 1926. Serial No. 87,358.

The invention relates to improvements in pneumatic tires, as described in the present specification and illustrated in the accompanying drawings that form part of the same.

The invention consists essentially of the novel arrangement and construction of parts whereby the tire wall having a bead at the lower edge thereof is further provided with an integrally formed compressible filler pad.

The objects of the invention are to devise a pneumatic tire which may be manufactured with desirable tolerances and readily applied to rim structures in such manner that the tire bead and rim tire seat will meet and remain in contact, thereby preventing chafing of the tire bead or pinching of the inner tube.

In the drawings, Figure 1 is a cross sectional view, showing the side walls of a tire fitted to a straight side rim.

Figure 2 is a cross sectional view showing a modified form of the tire fitted to a clincher type rim.

Figure 3 is a cross sectional view showing a modified form of the tire fitted to a rim having a removable side ring; while—

Figure 4 is a cross sectional view showing a modified form of the tire fitted on a straight side type of rim with the case or valley portion of reduced diameter.

Like numerals of reference indicate corresponding parts in the several figures.

Referring particularly to Figure 1 of the drawings, the numeral 10 indicates a tire having the side walls 11 each having the bead 12 formed around the inextensible cable 13 as customary, these beads being made to a diameter that will fit onto a metal rim 14, shown in this instance with straight side walls 15, and it will be understood that the tire beads and rim being both inextensible will require that certain manufacturing tolerances must be allowed, and when it happens that a rim of a minimum tolerance in size is used with a tire of a maximum tolerance in size, a sufficient space is left between the two to permit relative movement of the said rim and tire, and this movement often causes chafing and permits moisture to enter under the tire beads, which rots the fabric of the tire and likewise any protective strip such as shown at 16. It is also not unusual for the inner tube 17 to become pinched between the rim and tire bead and be cut through.

In the present invention a pad 18 of soft pliable rubber is vulcanized to the under side of the bead, and extends from the inner side or toe portion 19 to a point adjacent the outer side or heel portion 20, sufficient space being left between the heel 20 and the side wall of the rim for the soft rubber pad to flow into the same, as also to flow inwardly past the toe when the tire and rim are sufficiently close in size.

In Figure 2 the tire 21 has the beads 22 formed in the well known "clincher" shape, and has the soft rubber pad 42 to fit the clincher rim 23. Likewise in Figure 3 a tire 24 is shown with the pads 25 fitting the rim 26 with the quick detachable ring 27, while in Figure 4 the tire 28 has the pads 29 forming more decided toe portions with the center space 30 formed to permit flow of the pad when required to fit the drop centre portion of the rim 31.

The tires as shown will always be easy to remove from the rims as the soft pad fits tightly against the rim metal and seals it against wear or corrosion, and yet when the pressure inside the tire is released the side walls and beads may be easily separated from the rim, as the soft rubber of the pad will always permit the bead to be moved inwardly from the side wall of the rim when there is no inside air pressure to hold it in place.

It will be obvious that the pads shown in Figures 1 to 3 inclusive may be ribbed as shown in Figure 4, and other modifications may be made without departing from the spirit of the invention.

I claim:

1. A pneumatic tire casing formed of comparatively inextensible rubberized material and having side walls with beads around their inner periphery and compressible pads of rubber fastened to said beads on the inner periphery thereof and extending therearound and ridged to permit flow of the rubber when contacting with the base of a tire receiving rim.

2. A cushion tire formed of comparatively inextensible material having side walls with a compressible ridge narrower than and extending around the inner periphery of said side walls for engagement with a tire receiving rim.

In testimony whereof I affix my signature.

FRANK L. MAIN.